United States Patent [19]

Lester

[11] 3,904,038

[45] Sept. 9, 1975

[54] PACKAGE OF PRESSURE SENSITIVE ADHESIVE DROPLETS

[75] Inventor: David Lester, Cambridge, Mass.

[73] Assignee: Polymerics, Inc., Waltham, Mass.

[22] Filed: June 7, 1973

[21] Appl. No.: 367,743

[52] U.S. Cl. ............................................... 206/447
[51] Int. Cl.² ........................................ B65D 85/70
[58] Field of Search ........... 206/343, 344, 345, 346, 206/447, 460

[56] References Cited
UNITED STATES PATENTS

| | | | |
|---|---|---|---|
| 2,142,194 | 1/1939 | Karfiol | 206/447 |
| 3,080,683 | 3/1963 | Sallie | 206/447 X |

Primary Examiner—Donald F. Norton
Attorney, Agent, or Firm—Morse, Altman, Oates & Bello

[57] ABSTRACT

Pressure sensitive droplets are provided in solid form for use as a substitute for thumb tacks, for attaching various objects to one another in crafts such as paper tole and other similar uses. A pressure sensitive adhesive composition is extruded in a hot molten droplet form onto release material on which the droplets cool and adhere slightly thereto for packaging and are easy to remove for use. For packaging purposes a second release sheet may be superimposed on top of the droplets until ready for use. Compositions, manufacturing processes and apparatus for mass production are disclosed.

5 Claims, 5 Drawing Figures

PATENTED SEP 9 1975

3,904,038

PACKAGE OF PRESSURE SENSITIVE ADHESIVE DROPLETS

BACKGROUND OF THE INVENTION

1. Field of the Invention

This invention relates generally to pressure-sensitive adhesive products and more particularly is directed towards a new and improved pressure-sensitive adhesive droplet including packaging for said droplet and the method and associated apparatus for manufacturing said droplets.

2. Description of the Prior Art

Items such as posters, notices, calendars and the like normally are hung on walls or bulletin boards by means of thumb tacks. In some instances, small magnets are used to hold such items against refrigerators or other metal surfaces. Tacks have certain disadvantages such as leaving a hole in the wall after removal, and being difficult or impossible to use on some surfaces such as concrete, metal, glass, etc. Also, the exposed large head of the tack may be esthetically objectionable in some instances. Magnets of course, are limited in use to ferrous metal surfaces.

Other conventional means for adhering one object to another include the application of an adhesive liquid or paste to one or both surfaces prior to bringing them together. Still other techniques have involved the use of pre-coating with a pressure-sensitive adhesive one or both of these surfaces so that they will adhere to one another when brought into contact. While the foregoing techniques are satisfactory for many applications, they possess certain drawbacks particularly when employed in certain projects especially those of a creative or artistic nature. For example, the use of liquid or semi-liquid adhesive to join objects entails a certain amount of drying time before the parts are set and the adhesive itself must be kept covered when not in use. Pressure-sensitive adhesives, on the other hand, normally are applied as a coating by mass production machinery onto precut paper or in tape form. The presence of the backing tape or other supporting stratum for the pressure-sensitive adhesive may be objectional for certain uses.

Accordingly, it is an object of the present invention to provide a new and improved adhesive medium for joining two or more objects in a simple, neat and clean fashion. Another object of this invention is to provide a novel method and apparatus for producing the new adhesive medium including a novel package therefor.

SUMMARY OF THE INVENTION

This invention features a novel adhesive medium comprising droplets of pressure-sensitive adhesive that is comprised entirely of solids. The preferred form of the invention is a styrene isoprene polymer compounded with tackifiers and an antioxidant. The droplets are packaged by placing the same on a release stratum to which they lightly adhere and a second release stratum may be overlaid on the droplets so that sheets may be rolled or cut and stacked for shipping, storage and retailing.

The droplets can be packaged in blister packages comprised of a backing release sheet of silicon coated paper board, paper, or plastic on which the droplets are attached and a clear plastic blister cover bonded to the backing sheet but out of contact with the droplets.

The invention also features a novel method and apparatus for producing and packaging the droplets, comprising the steps and apparatus for pre-heating the adhesive to form a melt, extruding the hot melt adhesive through an applicator and depositing it in droplet form onto a release stratum such as silicon or wax-coated paper or board which serves as both a carrier and release holder for the droplets. A conveyor system is provided to move the release stratum past an extrusion station with timing control means to actuate the extruder in timed intervals. A second release sheet is overlaid continuously onto the moving first release sheet and a cutting station is provided for cutting the sheets to length.

DETAILED DESCRIPTION OF THE PREFERRED EMBODIMENTS

Figure 1:
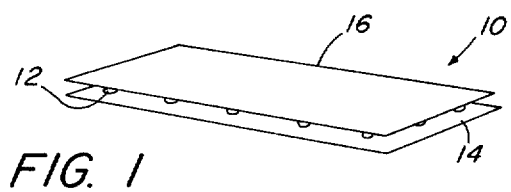
FIG. 1 is a view in perspective of a package of pressure-sensitive adhesive droplets made according to the invention.

Referring now to the drawings and to FIG. 1 in particular, the reference character 10 generally indicates a package comprised of pressure-sensitive adhesive droplets 12 mounted between a pair of sheets 14 and 16 of release material. The droplets 12 are in a small (typically ¼ inch diameter) and somewhat spherical slightly flattened form comprised of 100% solids and of pressure-sensitive adhesive material having a tack level that permits easy handling yet provides good adhesion and ready to use at all times.

The droplets, in accordance with the preferred form of the invention, are made by the following formulation.

|  | Parts By Weight |
| --- | --- |
| Kraton 107 | 100 |
| Foral 105 | 100 |
| Ionax 330 | 1 |

Another satisfactory formulation for use in making the pressure-sensitive adhesive droplets according to the invention is as follows:

|  | Parts By Weight |
| --- | --- |
| Kraton 107 | 100 |
| Stayhelite Ester 10 | 20 |
| Piccolyte S 100 | 5 |
| Ionax 330 | 1 |

In the above formulations the material identified as Kraton 107 is a styrene isoprene polymer manufactured by Shell Chemical Company. Foral 105 is a hydrogenated pentaerythritol ester of resin acid made by hercules Powder Co. Ionax 330 is an antioxidant made by Shell Chemical Co. Staybelite Ester 10 is a glycerol ester of hydrogenated resin manufactured by Hercules Powder Co., and Picolyte S100 is a terpene polymer produced by Pennsylvania Industrial Chemical Corporation.

Figure 2:
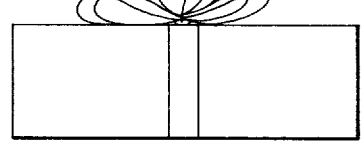
FIG. 2 is a view in side elevation showing a typical application of pressure-sensitive droplets made according to the invention.
Figure 4:
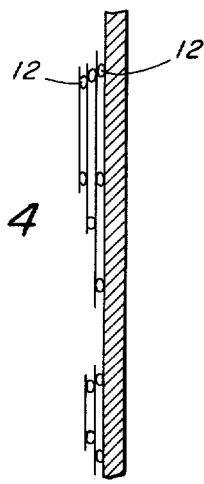
FIGS. 3 and 4 are sectional side views of typical uses of the droplets, and, FIG. 5 is a view in perspective, somewhat schematic, illustrating a system made according to the invention for producing the pressure-sensitive adhesive droplets and packages thereof.
Figure 3:
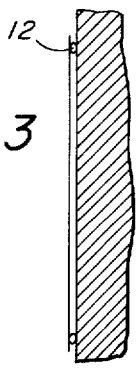

The droplets are formed by a hot melt technique in which the adhesive composition is heated to a molten state and extruded in droplet form directly onto a release surface to which the droplets lightly adhere until removed for use. The droplets thus formed display a pressure-sensitive adhesive quality useful for such applications as a thumb tack and magnet substitute in hanging papers, pictures and a variety of small objects on a vertical surface such as painted walls, refrigerator or the like as suggested in FIG. 3 or to apply decorations to gift wrapped packages as suggested in FIG. 2. The droplets may also be used to create three dimensional pictures by placing the drops between layers of superimposed pictures as suggested in FIG. 4. This craft is generally referred to a paper tole or three dimensional decoupage. The composition disclosed herein also has the advantage that it is non-toxic so that it is safe for use by children and complies with food packaging requirements of the FDA. Previously paper tole craft involved the use of highly toxic silicone adhesives.

The tack level of the adhesive droplets may be varied from zero to a very high peel strength. For ease of handling, however, the tack level should be on the order of 5-20 oz./inch peel strength range so that the droplets do not stick to the users' fingers but do display sufficient strength to adhere to most common surfaces.

Figure 5:
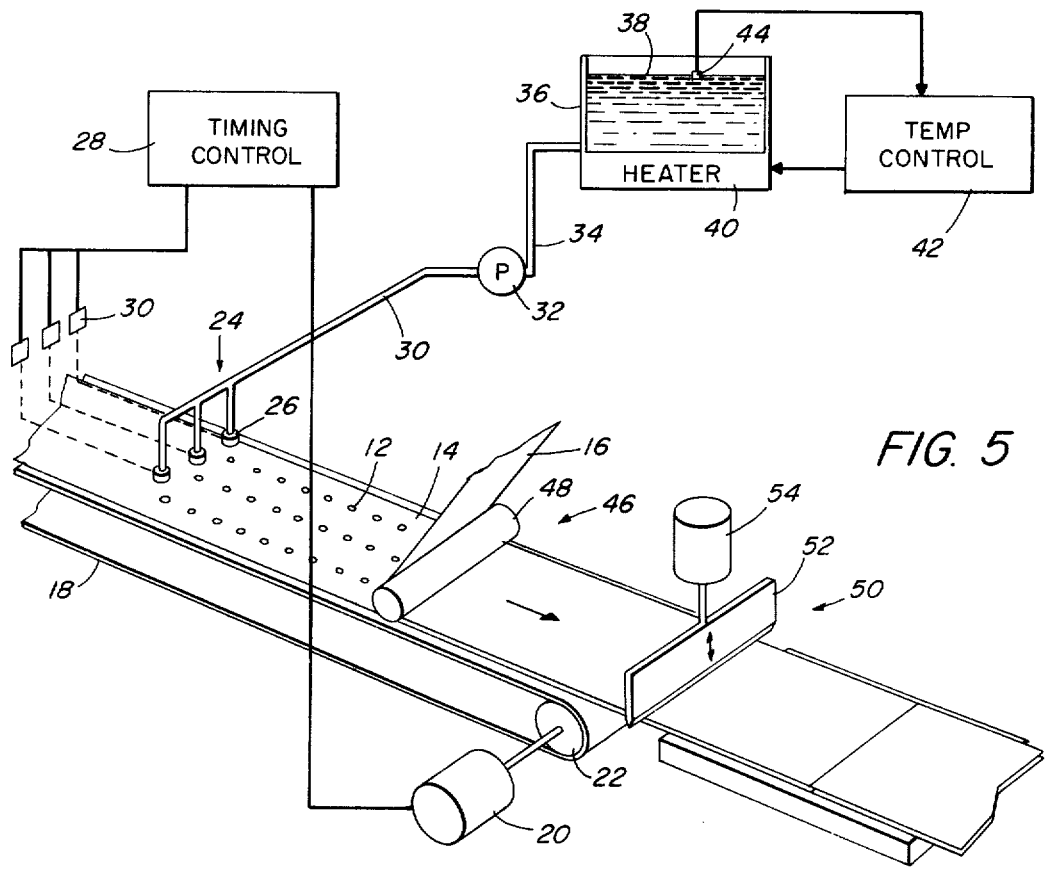

Referring now to FIG. 5 of the drawings, there is illustrated an apparatus for automatically producing and directly packaging the droplets 12. The apparatus of FIG. 5 is generally organized about a conveyor 18 which carries on its upper reach a web 14 of release material, the conveyor being moved by means of a motor 20 driving a roller 22. The web of release material preferably is a silicone or wax-coated paper or board and serves both as a carrier in the production process and as a release holder in the packaged product. Disposed above the upper reach of the conveyor 18 is an extrusion station 24 comprised of a battery of extrusion nozzles 26 extending transversely across the web 14 and adapted to open and close in a predetermined sequence by a timing control system generally indicated by reference character 28 and including a battery of solenoids 30 adapted to actuate the extrusion nozzles 26. The timing control 28 is also operatively connected to the motor 20 so that the speed of the conveyor and web 14 are synchronized with the operation of the nozzles 26 to insure even spacing of the droplets onto the web 14.

The bank of extrusion nozzles 26 is connected by a conduit 30 to a pump 32 which, in turn, is connected by a conduit 34 to a tank 36 containing a quantity of molten adhesive composition 38. The tank 36 is provided with a heater 40 which maintains the liquid 38 in a molten state foe delivery to the extrusion nozzles by the pump 32. The temperature of the molten composition is maintained at a preset level by means of a temperature control system indicated by reference character 42 and including a temperature-sensing element 44 providing temperature information to the control unit 42 which, in turn, is employed to control the heater 40.

From the dispensing station 24 the web 14 of release material, together with the droplets carried thereon, is advanced by the conveyer to a covering station generally indicated by reference character 46 and including a roll 48 extending transversely above the conveyor 18 and about which is carried a web 16 of release material. The roll 48 thus serves to apply the release sheet 16 over the droplets. The second release sheet 16 may be a wax or silicone coated sheet of paper or board similar to the first release sheet. If a blister package is used, the second release sheet 16 is not needed. In practice, the spacing between the covering station 46 and the dispensing station 24 should be sufficient to allow the droplets to cool before the second release sheet 16 is applied. To enhance the cooling operation, a fan or other positive cooling means may be employed to accelerate the cooling process.

The droplets when first deposited on the release sheet 14 are still hot and thereby tend to wet out the release surface at the points of contact to provide the initial cling to that surface. When the droplets cool they display a small degree of adhesion to the release sheet, enough so that the droplets will cling to that sheet when being packed or handled. However, the adhesion is not such as to prevent the droplets from being easily peeled off when they are to be used. The user may easily remove the droplets from their base sheet holder with his fingers and then use them as desired. When the droplets have cooled sufficiently, the second release sheet 16 is applied on top of the droplets but the droplets will cling to the surface that they contacted when hot.

From the station 46, the sheets 14 and 16, together with the droplets, may be passed through a cutting station 50 comprised of a cutting knife 52 operated as by an automatically controlled piston and cylinder 54, solenoid or the like. The cutting station is employed to cut the web to any desired length when the sheets of material together with the droplets are to be packaged in a flat form. The cutting station may be eliminated if the packaged droplets are to be provided in rolled up form.

Having thus described the invention what I claim and desire to obtain by Letters Patent of the United States is:

1. A package comprising:
   a. a sheet of release material; and
   b. a plurality of droplets of a pressure sensitive material distributed over the surface of said sheet and lightly adherent thereto, said droplets having a tack level that is sufficiently high to provide good adhesion to common surfaces and that is sufficiently low to be readily removed from said sheet by a user without sticking to the fingers of the user.

2. A package according to claim 1 including a second release sheet superimposed over said first sheet, said droplets disposed between said first sheet and said second sheet.

3. A package according to claim 1 wherein said droplets are entirely in solid form.

4. A package according to claim 3 wherein the tack level of said droplets is in the range of 5-20 oz/inch peel strength.

5. A package according to claim 4 wherein said pressure sensitive material includes by weight 100 parts styrene isoprene polymer, 100 parts hydrogenated pentaerythritol ester of resin and 1 part antioxidant.

* * * * *